United States Patent
Huang et al.

(10) Patent No.: US 8,769,367 B2
(45) Date of Patent: Jul. 1, 2014

(54) APPARATUS, METHOD, AND SYSTEM FOR IP ADDRESS NEGOTIATIONS

(75) Inventors: Jen-Chieh Huang, Taipei County (TW); Yuan-Chieh Lin, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 1010 days.

(21) Appl. No.: 12/695,431

(22) Filed: Jan. 28, 2010

(65) Prior Publication Data

US 2011/0185250 A1    Jul. 28, 2011

(51) Int. Cl.
*H04L 1/18*    (2006.01)
(52) U.S. Cl.
USPC ......................................................... 714/749
(58) Field of Classification Search
CPC ..... H04L 1/1887; H04L 1/1812; H04L 1/188; H04L 1/1671; H04L 1/1854
USPC ......................................................... 714/749
See application file for complete search history.

(56) References Cited

U.S. PATENT DOCUMENTS

| | | | |
|---|---|---|---|
| 6,775,553 B1 | 8/2004 | Lioy | |
| 7,412,528 B2 | 8/2008 | Mir et al. | |
| 2003/0076819 A1* | 4/2003 | Emerson, III | 370/352 |
| 2003/0212774 A1* | 11/2003 | Lee et al. | 709/222 |
| 2005/0083907 A1* | 4/2005 | Fishler | 370/352 |
| 2009/0147772 A1* | 6/2009 | Rao et al. | 370/352 |
| 2010/0050040 A1* | 2/2010 | Samuels et al. | 714/749 |
| 2012/0044908 A1* | 2/2012 | Spinelli et al. | 370/331 |

FOREIGN PATENT DOCUMENTS

| | | |
|---|---|---|
| CN | 1628433 | 6/2005 |
| WO | WO 03/067803 | 8/2003 |
| WO | WO 2009/055827 | 4/2009 |

\* cited by examiner

*Primary Examiner* — Albert Decady
*Assistant Examiner* — Enam Ahmed
(74) *Attorney, Agent, or Firm* — McClure, Qualey & Rodack, LLP

(57) ABSTRACT

A wireless communications device for IP address negotiations is provided and comprises a wireless module, a connection device, and a processing unit. The wireless module provides wireless communications from and to a service network. The connection device is coupled to the terminal device. The processing unit is coupled to the connection device and the wireless module, receiving an IP address request message from the terminal device via the connection device, and requests an IP address and a DNS address from the service network via the wireless module in response to an IP address request message from the terminal device. Also, the processing unit determines whether allocated IP address and DNS address have been received from the service network, and sends a rejection message to the terminal device to trigger the terminal device to resend the IP address request message in response to determining that the allocated IP address and DNS address have not been received from the service network.

14 Claims, 7 Drawing Sheets

APPARATUS, METHOD, AND SYSTEM FOR IP ADDRESS NEGOTIATIONS

BACKGROUND OF THE INVENTION

1. Field of the Invention

The invention generally relates to IP address negotiations, and more particularly, to an apparatus, method, and system to avoid timeouts during IP address negotiations.

2. Description of the Related Art

With growing demand for ubiquitous computing and networking, the Global System for Mobile communications (GSM) system which mainly supports circuit-switched services is not longer a satisfactory option for wireless communications. Telecommunication standard groups therefore, has established standards for third generation (3G) wireless communications technologies, such as the Wideband Code Division Multiple Access (W-CDMA) for the Universal Mobile Telecommunications System (UMTS), Code Division Multiple Access-2000 (CDMA-2000), and Time Division-Synchronous Code Division Multiple Access (TDS-CDMA). 3G wireless communications technologies have been developed based upon Code Division Multiple Access (CDMA) technology. CDMA is a digital radio-frequency (RF) channelization technique defined in the Telecommunications Industry Association/Electronics Industries Association Interim Standard-95 (TIA/EIA IS-95). Wireless communications systems employing the CDMA technology assign a unique code to communication signals and spread these communication signals across a common (wideband) spread spectrum bandwidth. As long as the receiving apparatus in a CDMA system has the correct code, it can successfully detect and select its communication signal from the other signals concurrently transmitted over the same bandwidth. The use of the CDMA technology produces an increase in system traffic capacity, improves overall call quality and noise reduction, and provides a reliable transport mechanism for data service traffic. Thus, 3G wireless communications technologies are directed towards increased data rates, which support large user numbers and data-intensive applications.

In a typical telecommunications environment, a user may use a mobile terminal (MT) that supports any of the 3G wireless communications technologies for ubiquitous computing and networking. An MT generally refers to a portable user equipment, such as a cell phone, a personal digital assistant (PDA), or a smart phone. However, other type of devices may be incorporated with an MT to provide various controls and/or management over the wireless communications networks. A well-known scenario is to incorporate a terminal equipment (TE) with an MT to obtain the wireless communications services via the MT. The TE may be a Personal Computer (PC), a laptop, or a palmtop computer. FIG. 1 illustrates a wireless communications system of such scenario. A system 100 allows a TE 110 to communicate with a service network 130 via an MT 120. The service network 130 can provide wireless connectivity of at least one of the circuit-switched and packet-switched services to the MT 120. In addition, the service network 130 may be connected to other networks, such as the Public Switched Telephone Network (PSTN) or wireline/wireless packet data networks, via a Gi interface. The communications interface between the MT 120 and the service network 130 is a wireless interface Um, and the TE 110 is electronically coupled to the MT 120 via an R interface. The R interface may be a Universal Asynchronous Receiver/Transmitter (UART), a Universal Serial Bus (USB), Bluetooth, or others. The communication over the R interface may employ a Point-to-Point Protocol (PPP), which is a commonly used data link protocol for establishing a direct connection between two networking nodes and is widely supported in numerous operating systems. PPP at the TE 110 and the MT 120 comply with the following specifications: IETF STD 51 (RFC 1661, RFC 1662), RFC 1570, RFC 1989, RFC 1332 for IPv4, and optionally RFC 2472 for IPv6. Alternatively, the TE 110 and the MT 120 may be integrated into a single unit or device.

In system 100, when requiring the packet domain access to the Internet, the TE 110 may use PPP to connect to the service network 130 via the MT 120 and obtain an IP address and some Domain Name Server (DNS) addresses (two addresses in typical). FIG. 2 shows a message sequence chart depicting Internet Protocol Control Protocol (IPCP) negotiations in a wireless communications system using the General Packet Radio Service/Universal Mobile Telecommunications System (GPRS/UMTS) based technology. To begin with, a Link Control Protocol (LCP) negotiation is performed between the TE 110 and the MT 120 to set the configuration of the interfaces at each end, such as setting a datagram size, escaped characters, and magic numbers, and for selecting an authentication protocol, such as Challenge-Handshake Authentication Protocol (CHAP), Password Authentication Protocol (PAP), or 'none' (step S210). The MT 120 may negotiate for a CHAP as a first priority. Subsequently, if necessary, the selected authentication algorithm is performed between the TE 110 and the MT 120 (step S220). During the authentication, the TE 110 authenticates itself towards the MT 120 by means of the selected authentication protocol. The MT 120 stores the necessary authentication data and sends a forced positive acknowledgement of the authentication to the TE 110. If 'none' is selected as the authentication protocol, no authentication is performed subsequent to the LCP negotiation. After a successful authentication, the TE 110 initiates an IPCP Negotiation to request an IP configuration by sending an IPCP CONFIG REQ message to the MT 120 indicating that either a static or a dynamic IP address and DNS addresses are to be allocated (step S230). Upon receiving the IPCP CONFIG REQ message, the MT 120 sends an ACTIVATE PDP CONTEXT REQ message to the service network 130, including the protocol configuration options (step S240). Accordingly, the service network 130 determines whether to accept the request based on the protocol configuration options in the ACTIVATE PDP CONTEXT REQ message. If the request is accepted, the service network 130 sends an ACTIVATE PDP CONTEXT ACC message, including the allocated IP address and DNS address, to the MT 120 (step S250). Upon receiving the ACTIVATE PDP CONTEXT ACC message, the MT 120 includes the allocated IP address and DNS address in an IPCP CONFIG NACK message, and sends the IPCP CONFIG NACK message to the TE 110 (step S260). Upon receiving the IPCP CONFIG NACK message, the TE 110 sends another IPCP CONFIG REQ message to the MT 120 including the allocated IP address and DNS address (step S270). At last, the MT 120 replies with an IPCP CONFIG ACK message to the TE 110 to confirm the IPCP CONFIG REQ message (step S280). Thus, the link from the TE 110 to the external ISP/Intranet is established and IP packets may be exchanged.

However, there are situations that the consummation of the IPCP Negotiation may be obstructed due to operational delays. For example, the transceiving rate between the MT 120 and the service network 130 may be slower than that between the TE 110 and the MT 120. Thus, the IP address request from the TE 110 may not be granted or may expire because the MT 120 has not completed the address negotiations on the Um interface to render an IP address from the service network 130. Another example of an operational delay occurs when the service network 130 has to get the IP address from some other entity before it can pass the IP address to the MT 120. In doing so, there may be several seconds of delay before the MT 120 receives the IP address. Although the TE 110 is capable of waiting for the MT 120 to eventually render an IP address from the service network 130, there may be an implementation-specific timer for the TE 110. As shown in FIG. 3, if the MT 120 has not replied with an IPCP CONFIG ACK message before a timeout occurs (or the timer expires), the TE 110 may resend the IPCP CONFIG REQ message to the MT 120 (step S310 and S320). The resending of the IPCP CONFIG REQ message may be repeated as many times as configured until an IPCP CONFIG ACK message is received by the TE 110. After a waiting time limit of 12 seconds, for example, has been reached, the resent IPCP CONFIG REQ message would no longer include the request for DNS addresses (step S330). It is noted that, in other operating systems or configurations, the waiting time limit may be longer or shorter than 12 seconds. Next, when receiving an ACTIVATE PDP CONTEXT ACC message after the waiting time limit, the MT 120 would send an IPCP CONFIG NACK message, including only the IP address, to the TE 110 (step S340). Without a DNS address, the TE 110 can not use DNS services. As DNS services are one of the major services on the Internet, the delay may cause increased unsuccessful rate for establishing access connections between the TE 110 and DNS service providers. It is required to provide methods, systems or apparatuses to tolerate the delay during IPCP Negotiations to increase the successful rate of connection establishment.

BRIEF SUMMARY OF THE INVENTION

Accordingly, embodiments of the invention provide an apparatus, method, and system for IP address negotiations. In one aspect of the invention, a wireless communications device for IP address negotiations between a terminal device and a service network is provided. The wireless communications device comprises a wireless module, a connection device, and a processing unit. The wireless module provides wireless communications from and to the service network. The connection device is coupled to the terminal device. The processing unit is coupled to the connection device and the wireless module, receives an IP address request message from the terminal device via the connection device, and requests an IP address and a DNS address from the service network via the wireless module in response to the IP address request message. Also, the processing unit determines whether allocated IP address and DNS address have been received from the service network via the wireless module, and sends a rejection message to the terminal device via the connection device to trigger the terminal device to resend the IP address request message in response to determining that the allocated IP address and DNS address have not been received from the service network.

In another aspect of the invention, a method for a wireless communications device to perform IP address negotiations between a terminal device and a service network is provided. The method comprises receiving an IP address request message from the terminal device, determining whether allocated IP address and DNS address have been received from a service network in response to the received IP address request message, and sending a rejection message to the terminal device to trigger the terminal device to resend the IP address request message in response to determining that the allocated IP address and DNS address have not been received from the service network.

Other aspects and features of the present invention will become apparent to those with ordinarily skill in the art upon review of the following descriptions of specific embodiments of an apparatus, method, and system for IP address negotiations.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. In order to give clear examples, the embodiments described below employ the General Packet Radio Service/Universal Mobile Telecommunications System (GPRS/UMTS) based technology but the invention is not limited thereto. The embodiments may be applied to other cellular network technologies, such as Wideband Code Division Multiple Access (W-CDMA) for the Universal Mobile Telecommunications System (UMTS), Code Division Multiple Access-2000 (CDMA-2000), and Time Division-Synchronous Code Division Multiple Access (TDS-CDMA), utilizing General Packet Radio Service (GPRS) as its packet-switched service network.

Figure 1:
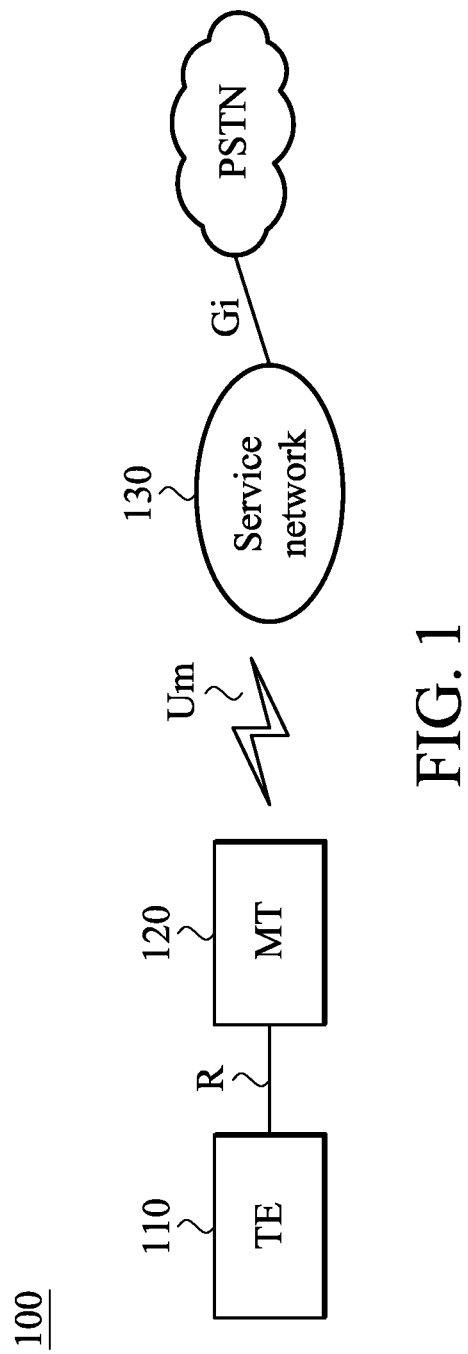
FIG. 1 shows a schematic view of a wireless communications system.
Figure 4:
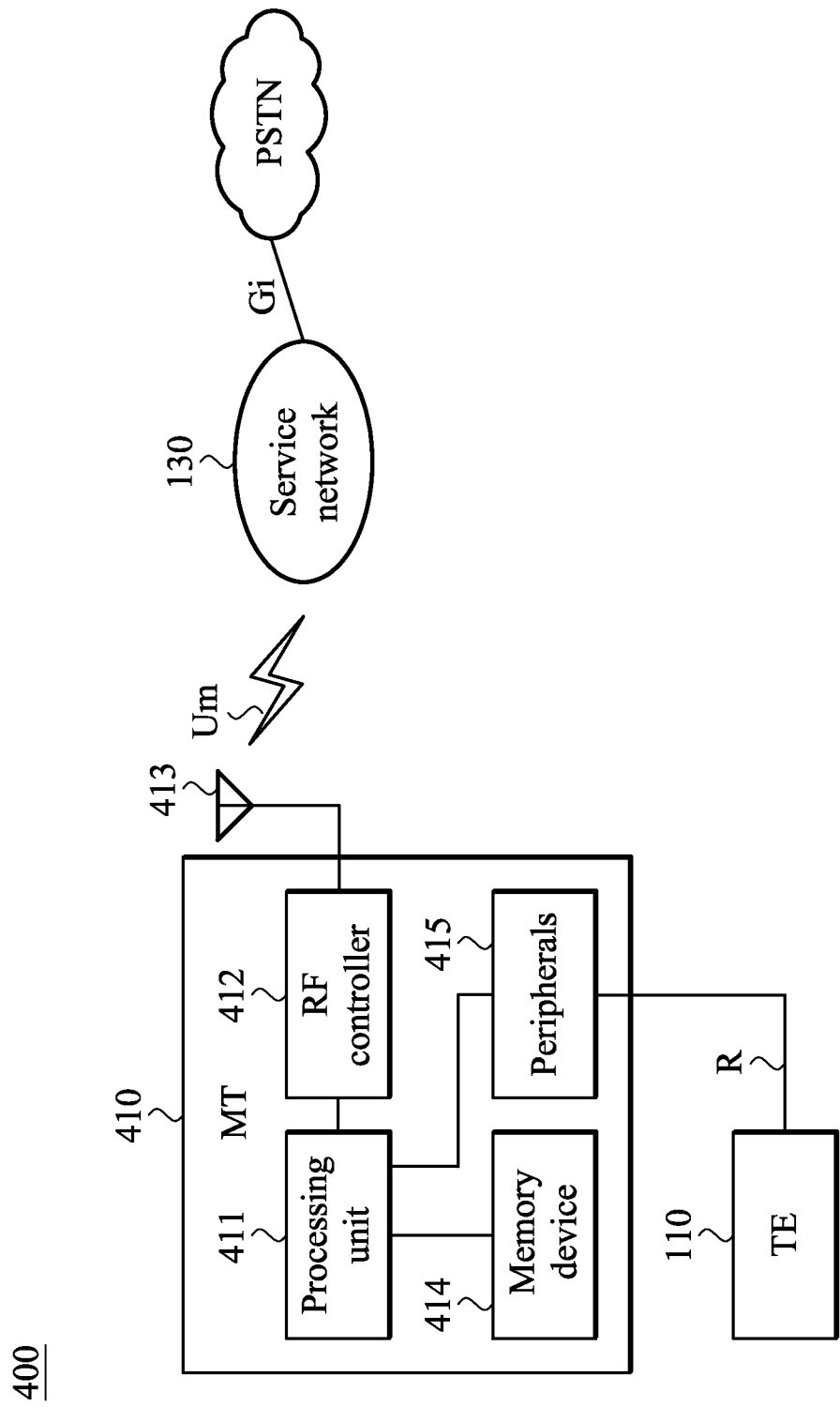
FIG. 4 shows a block diagram of a wireless communications system according to an embodiment of the invention.

FIG. 4 is a block diagram of a wireless communications system according to an embodiment of the invention. The system 400 comprises the terminal equipment (TE) 110 and the service network 130. Regarding descriptions of the TE 110 and the service network 130, reference may be made to FIG. 1. However, a mobile terminal (MT) 410 in the system 400 is different from the MT 120 in the system 100, and is capable of tolerating the transmission delay between the MT 410 and the service network 130 during Internet Protocol Control Protocol (IPCP) address negotiations. The MT 410 includes a processing unit 411, a radio frequency (RF) controller 412, an antenna 413, a memory device 414, and one or more peripherals 415. The RF controller 412 is coupled to the antenna 413, and controls the antenna 413 for transceiving wireless signals from/to the service network 130 via the Um interface. The Um interface between the MT 410 and the service network 130 complies with the standard of the GSM-based or 3G-based technology as mentioned. The peripherals 415 couple the MT 410 to the TE 110 via the R interface. The peripherals 415, complying with the R interface, may include a Universal Asynchronous Receiver/Transmitter (UART), a Universal Serial Bus (USB), Bluetooth, or other means for connecting the MT 410 with external devices, e.g. the TE 110. The memory device 414 stores a series of program codes implementing the method of the invention, and also stores instruction sets conforming to the architecture of the processing unit 411. The processing unit 411 may be a general-purposed processor, or a micro-control unit (MCU), or others, to execute the program codes stored in the memory device 414 and accordingly control the RF controller 412 and peripherals 415. The memory device 414 may be a volatile memory, e.g. a random access memory (RAM), or a non-volatile memory, e.g. a flash memory, read-only memory (ROM), or hard disk, or any combination thereof. The service network 130 may be the GSM-based or 3G-based network system, or others.

Figure 2:
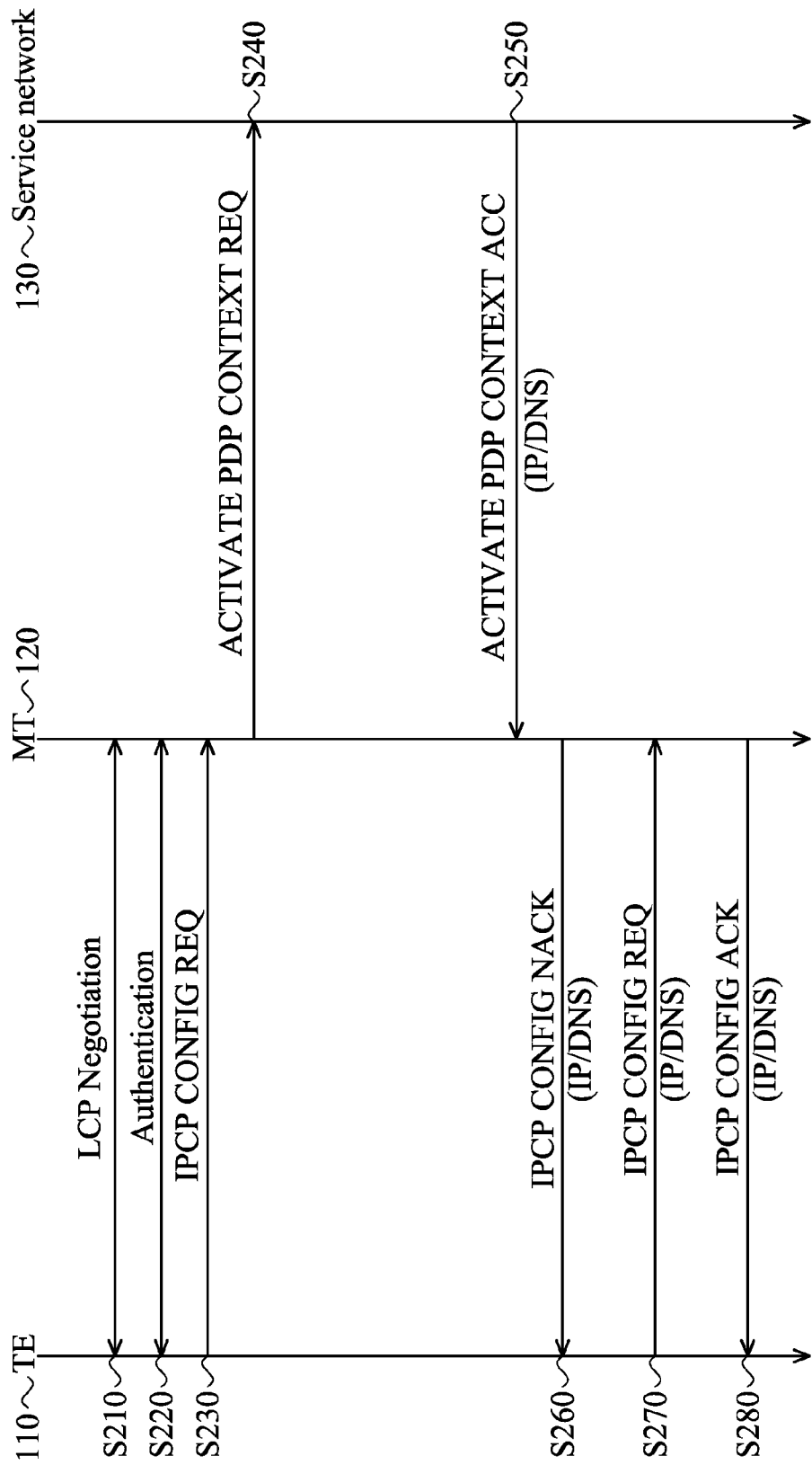
FIG. 2 shows a message sequence chart depicting Internet Protocol Control Protocol (IPCP) address negotiations in a wireless communications system using the General Packet Radio Service/Universal Mobile Telecommunications System (GPRS/UMTS) based technology.
Figure 3:
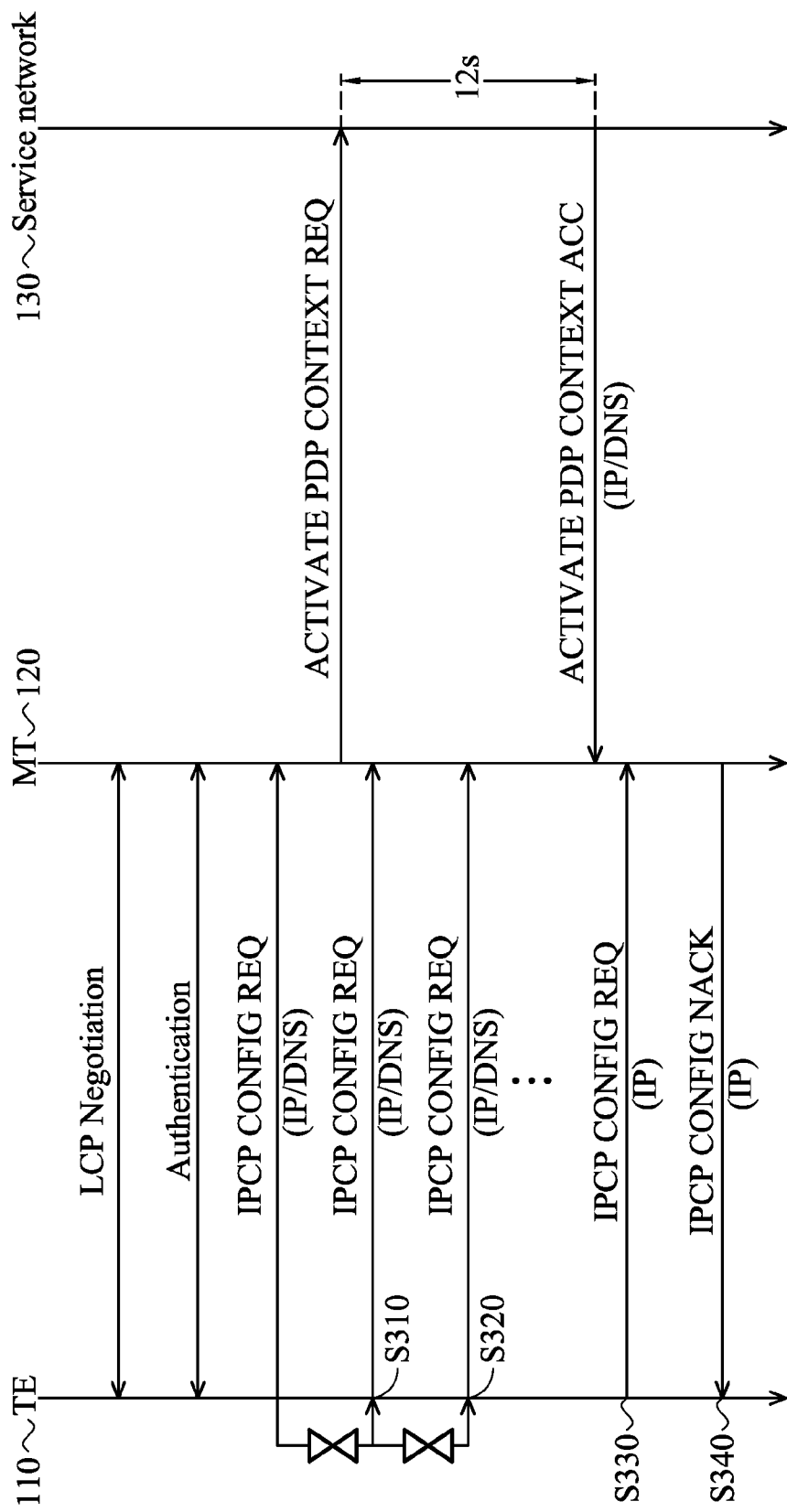
FIG. 3 shows a message sequence chart depicting timeouts during IPCP Negotiations in a wireless communications system using GPRS/UMTS-based technology.
Figure 5:
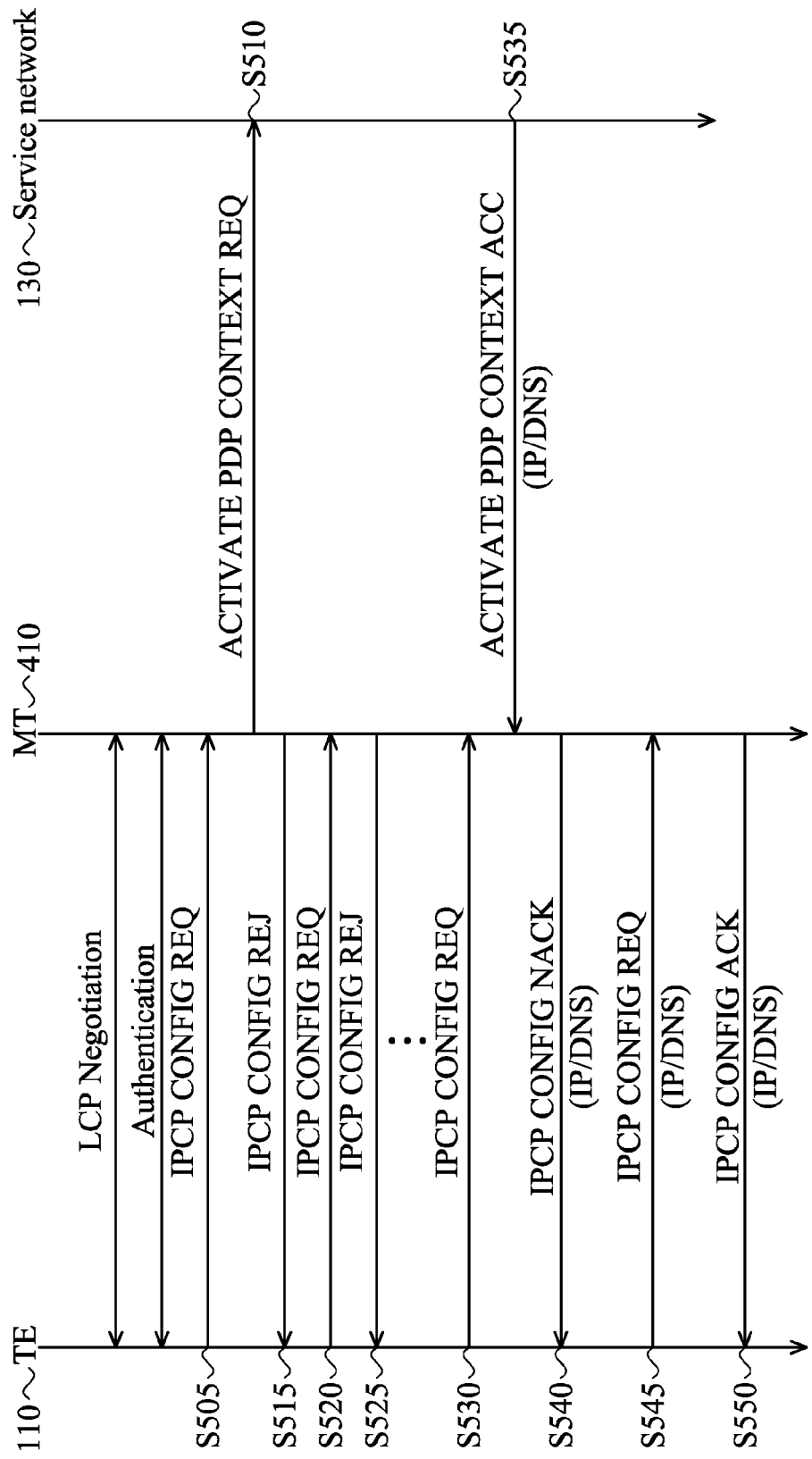
FIG. 5 shows a message sequence chart depicting the IPCP Negotiations according to an embodiment of the invention.

FIG. 5 is a message sequence chart depicting the PCP Negotiations according to an embodiment of the invention. To begin, the TE 110 and the MT 410 perform the Link Control Protocol (LCP) negotiation and authentication via the R interface. Regarding the LCP Negotiation and Authentication, reference may be made to FIG. 2. After the LCP negotiation and authentication are completed, the TE 110 sends an IPCP CONFIG REQ message to the MT 410 with requested IP configuration (step S505). Upon reception of the IPCP CONFIG REQ message, the MT 410 sends an ACTIVATE PDP CONTEXT REQ message to request to the service network 130 for network resources (step S510) and replies to the TE 110 with an IPCP CONFIG REJ message without any content (step S515). The reply of the IPCP CONFIG REJ message without any content attempts to maintain the communications between the TE 110 and the MT 410. When receiving the IPCP CONFIG REJ message, the TE 110 resends the IPCP CONFIG REQ message with the same IP configuration to the MT 410 since no cause for rejection was indicated in the IPCP CONFIG REJ message (step S520). Again, the MT 410 replies to the TE 110 with an IPCP CONFIG REJ message without any content (step S525), since an ACTIVATE PDP CONTEXT ACC message has not been received. The steps S520 and S525 may be repeated as many times as needed before an ACTIVATE PDP CONTEXT ACC message is received. After another resent IPCP CONFIG REQ message from the TE 110 (step S530), the MT 410 receives an ACTIVATE PDP CONTEXT ACC message with an allocated IP address and domain name server (DNS) address from the service network 130 (step S535). Subsequently, the MT 410 obtains and sends the allocated IP address and DNS address by an IPCP CONFIG NACK message to the TE 110 (step S540). The IPCP CONFIG NACK message indicates to the TE 110 that the IP configuration in the previous IPCP CONFIG REQ message was not acceptable and a new IP configuration is included within. The TE 110 then sends another IPCP CONFIG REQ message with the new IP configuration from the IPCP CONFIG NACK message, to the MT 410 (step S545). At last, the MT 410 replies to the TE 110 with an IPCP CONFIG ACK message with the new IP configuration (step S550). It is noted that, the IPCP CONFIG REJ message in steps S515 and S525 may be replaced with an IPCP CONFIG NACK message without any content to indicate to the TE 110 that the IP configuration in the IPCP CONFIG REQ message was not acceptable and no new IP configuration is included within. Upon reception of the IPCP CONFIG NACK message without a new IP configuration, the TE 110 would resends the IPCP CONFIG REQ message as described in steps S520 and S530.

Figure 6:
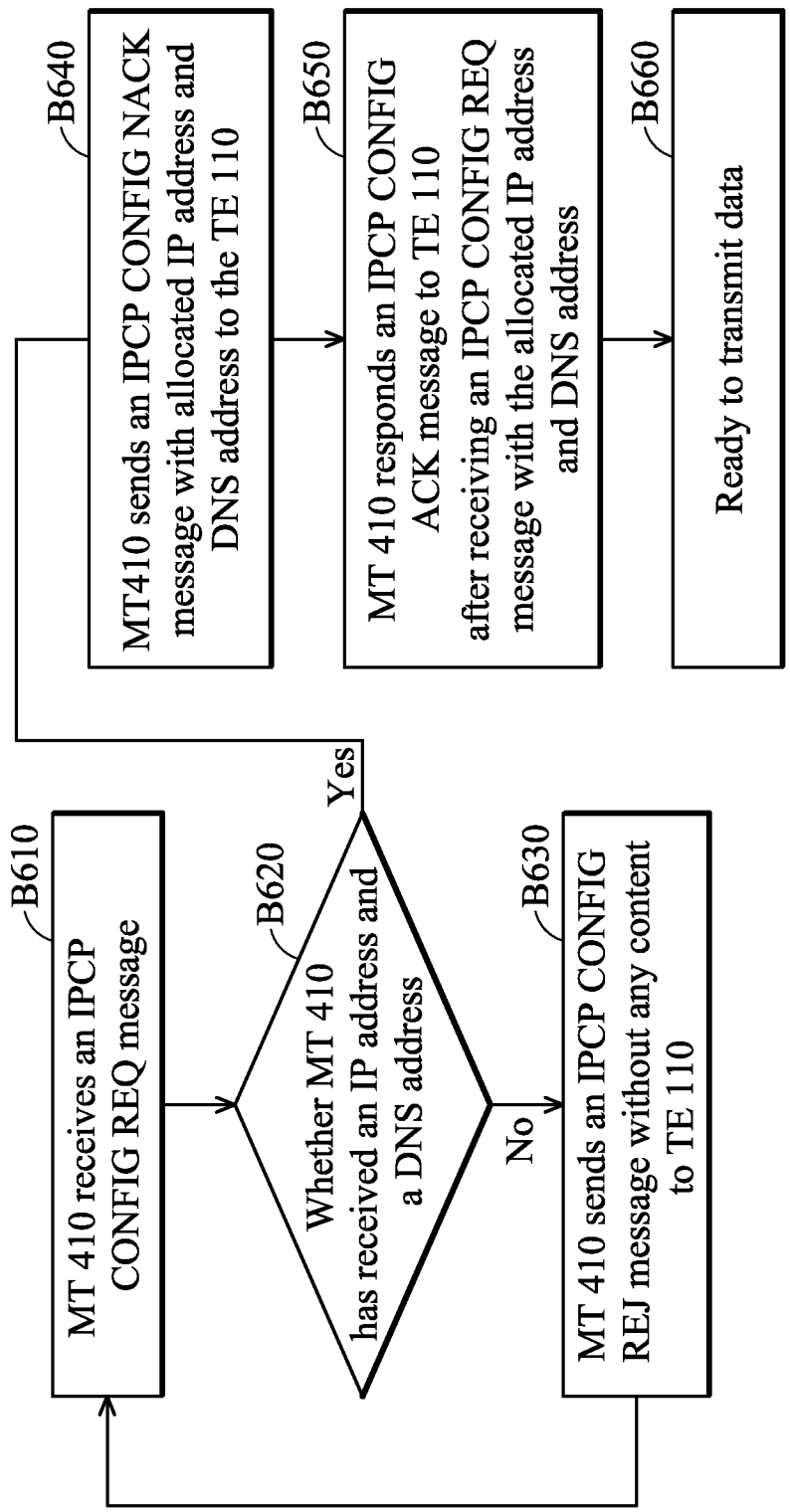
FIG. 6 shows a flow chart depicting the IPCP Negotiations in the system 400 according to an embodiment of the invention.

FIG. 6 is a flow chart depicting a method for handling the IPCP Negotiations, executed by the MT 410, according to an embodiment of the invention. Starting with block B610, the MT 410 receives an IPCP CONFIG REQ message from the TE 110. Once the MT 410 receives the IPCP CONFIG REQ message, the process progresses to block B620.

In block B620, the MT 410 determines whether it has received an IP address and a DNS address, allocated by the service network 130, in response to the received IPCP CONFIG REQ message. If not, the MT 410 advances to block B630, where it rejects the IP configuration of the IPCP CONFIG REQ message and sends an IPCP CONFIG REJ message without any content to the TE 110. The IPCP CONFIG REJ message without any content will initiate the TE 110 to resend the IPCP CONFIG REQ message with the same IP configuration. Upon sending the IPCP CONFIG REJ message without any content, the MT 410 loops back to block B610 to wait for another IPCP CONFIG REQ message. After that, if the MT 410 still receives no IP address and DNS address from service network 130 after receiving another IPCP CONFIG REQ message, the process proceeds back to block B630 to reject the resent IPCP CONFIG REQ message without any content to the TE 110 again. The loop created by the series of blocks B610, B620, and B630 iterates until the MT 410 determines that it has received an IP address and a DNS address from the service network 130. By engaging the TE 110 and triggering the TE 110 to resend the IPCP CONFIG REQ message, the MT 410 prevents the TE 110 from timing out during IPCP Negotiations.

In block B620, if so, the process progresses to block B640 where it sends an IPCP CONFIG NACK message, including an IP address and a DNS address allocated by the service network 130, to the TE 110. Subsequently, in block B650, the MT 410 sends an IPCP CONFIG ACK message to the TE 110 to acknowledge a received IPCP CONFIG REQ message with the allocated IP address and DNS address. Consequently, the IPCP Negotiations are completed, and in block 660, the TE 110 uses the allocated IP address and DNS address to transmit/receive packet data and access the Internet.

Figure 7:
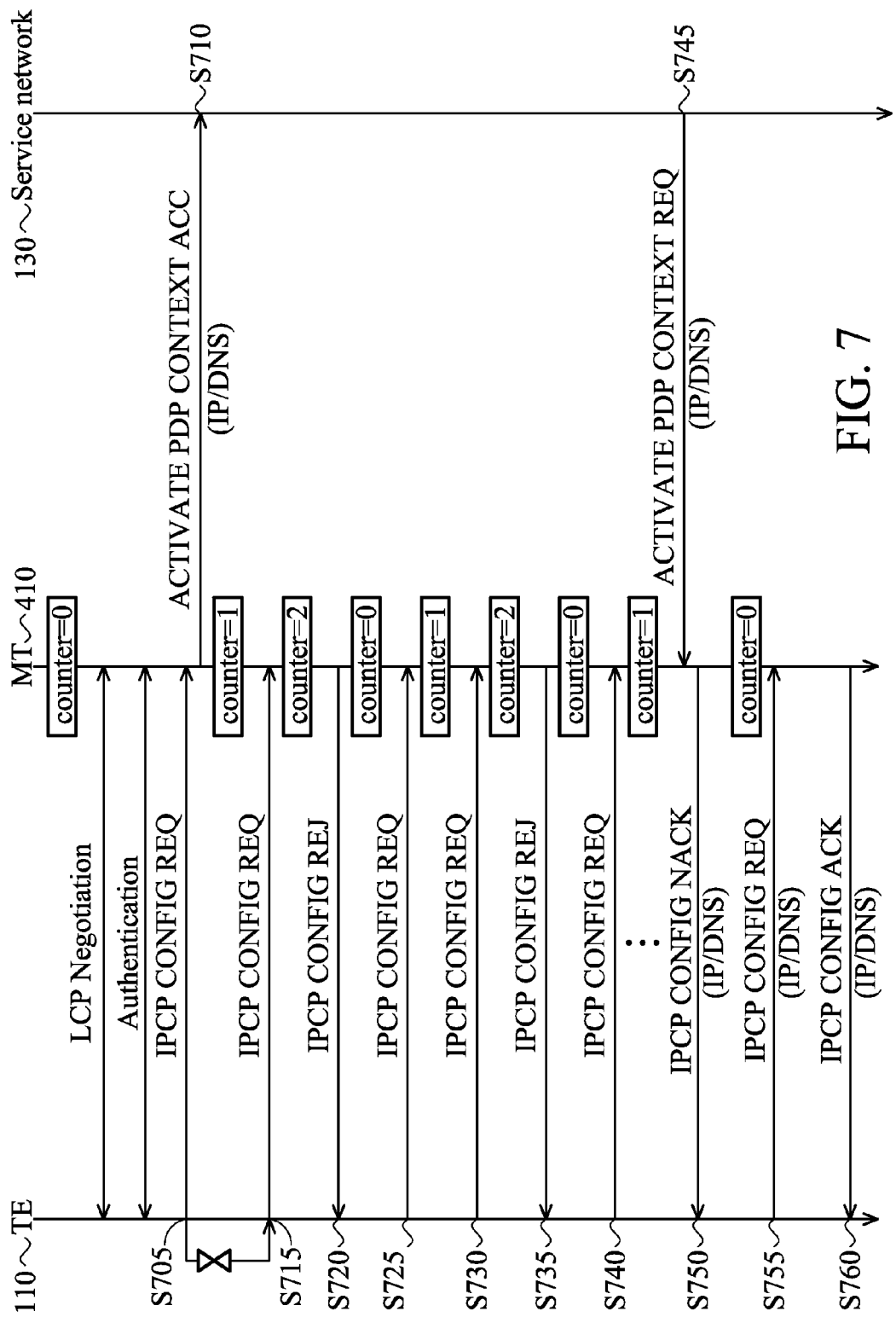
FIG. 7 shows a message sequence chart depicting the IPCP Negotiations according to another embodiment of the invention.

FIG. 7 is a message sequence chart depicting the IPCP Negotiations according to another embodiment of the invention. In this embodiment, the MT 410 further employs a counter-based mechanism to reduce the number of messages exchanged over the R interface. Compared with the embodiment as shown in FIG. 5, the MT 410 additionally counts the received IPCP CONFIG REQ messages from the last issuance of the IPCP CONFIG REJ message to the TE 110. The MT 410 only replies to the TE 110 with an IPCP CONFIG REJ message after receiving a predetermined count number of successive IPCP CONFIG REQ messages subsequent to the last issuance of the IPCP CONFIG REJ message. For example, the predetermined count number may be set to 2 in this embodiment, and the counter is initially set to 0. As shown in FIG. 7, the TE 110 and the MT 410 perform the LCP Negotiation and Authentication via the R interface. Regarding the LCP Negotiation and Authentication, reference may be made to FIG. 2. After the LCP Negotiation and Authentication are completed, the TE 110 sends an IPCP CONFIG REQ message to the MT 410 with a requested IP configuration (step S705). Upon reception of the IPCP CONFIG REQ message, the MT 410 sends an ACTIVATE PDP CONTEXT REQ message to the service network 130 (step S710) and increments the counter to 1. Since the value of the counter is less than the predetermined count number, i.e. 2, the MT 410 does not reply to the TE 110 with an IPCP CONFIG REJ message. If the MT 410 has not replied to the TE 110 with an IPCP CONFIG ACK/NACK/REJ message before a timeout occurs, the TE 110 resends the IPCP CONFIG REQ message to the MT 410. The MT 410 increments the counter to 2 upon receiving the resent IPCP CONFIG REQ message. In response to determining that the value of the counter is equal to 2, the MT 410 replies to the TE 110 with an IPCP CONFIG REJ message without any content (step S720). Upon sending the IPCP CONFIG REJ message without any content, the MT 410 resets the counter to 0. The reply of the IPCP CONFIG REJ message without any content attempts to maintain the communications between the TE 110 and the MT 410. Accordingly, the TE 110 continues to resend the IPCP CONFIG REQ message with the same IP configuration since no cause of rejection has been indicated in the IPCP CONFIG REJ message (step S725). Since the MT 410 does not reply to the TE 110 with an IPCP CONFIG REJ message, the TE 110 resends the IPCP CONFIG REQ message to the MT 410 again (step S730). In response to determining that the value of the counter is equal to 2, the MT 410 replies to the TE 110 with an IPCP CONFIG REJ message without any content (step S735), and resets the counter to 0. By using the counter to delay replying of an IPCP CONFIG REJ message to the TE 110, the MT 410 may reduce the number of messages exchanged over the R interface and thus, improve the performance of the TE 110. The steps S705, S715, and S720 (the same as steps S725, S730, and S735) may be repeated as many times as needed before an ACTIVATE PDP CONTEXT ACC message is received by the MT 410. After another resent of IPCP CONFIG REQ message from the TE 110 (step S740), the MT 410 receives an ACTIVATE PDP CONTEXT ACC message with an allocated IP address and DNS address from the service network 130 (step S745). Subsequently, the MT 410 sends an IPCP CONFIG NACK message with the allocated IP address and DNS address to the TE 110 (step S750), and resets the counter to 0. The IPCP CONFIG NACK message indicates to the TE 110 that the IP configuration in the IPCP CONFIG REQ message was not acceptable and a new IP configuration is included within. The TE 110 then sends another IPCP CONFIG REQ message with the new IP configuration from the IPCP CONFIG NACK message, to the MT 410 (step S755). At last, the MT 410 replies to the TE 110 with an IPCP CONFIG ACK message with the new IP configuration (step S760). It is noted that, the IPCP CONFIG REJ message in steps S720 and S735 may be replaced with an IPCP CONFIG NACK message including no content to indicate to the TE 110 that the IP configuration of the IPCP CONFIG REQ message was not acceptable and another IPCP CONFIG REQ message is required. In other embodiments, the predetermined count number may be greater than 2, so as to further reduce the quantity of messages exchanged over the R interface. The predetermined count number may be set to a value to guarantee that a timeout is not occurred in the TE 110.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communications device for IP address negotiations between a terminal device and a service network, comprising:
   a wireless module providing wireless communications from and to the service network;
   a connection device, coupled to the terminal device; and
   a processing unit, coupled to the connection device and the wireless module, receiving an IP address request message from the terminal device via the connection device, requesting an IP address and a DNS address from the service network via the wireless module in response to the IP address request message, determining whether allocated IP address and DNS address have been received from the service network via the wireless module, and sending a rejection message to the terminal device via the connection device to trigger the terminal device to resend the IP address request message in response to determining that the allocated IP address and DNS address have not been received from the service network,
   wherein the rejection message is an Internet Protocol Control Protocol (IPCP) CONFIG REJ message without any content, and
   wherein the processing unit further delays the sending of the resection message until a predetermined count number of successive IP address request messages have been received, subsequent to the last sending of the resection message, from the terminal device via the connection device.

2. The wireless communications device of claim 1, wherein the processing unit further sends an IP address negative-acknowledgement (NACK) message with the allocated IP address and DNS address to the terminal device via the connection device in response to determining that the allocated IP address and DNS address have been received from the service network, receives an IP address request message with the allocated IP address and DNS address from the terminal device via the connection device after the sending of the IP address NACK message, and sends an IP address acknowledgement (ACK) message with the allocated IP address and DNS address to the terminal device via the connection device.

3. The wireless communications device of claim 1, wherein the delaying comprises counting the received IP address request messages subsequent to the last sending of the rejection message, determining whether the received IP address request messages have reached the predetermined count number, and sending the rejection message to the terminal device via the connection device in response to determining that the received IP address request messages have reached the predetermined count number.

4. The wireless communications device of claim 3, wherein the delaying comprises ignoring the currently received IP address request message in response to determining that the received IP address request messages have not reached the predetermined count number.

5. The wireless communications device of claim 1, wherein the rejection message indicates to the terminal device that an IP configuration of the received IP address request message is not acceptable and a new IP configuration is included within.

6. The wireless communications device of claim 5, wherein the rejection message is an Internet Protocol Control Protocol (IPCP) negative-acknowledgement (NACK) message without an IP address and DNS address.

7. The wireless communications device of claim 1, wherein the connection device and the terminal device is coupled with a Point-to-Point Protocol (PPP) for the terminal device being a PPP client and the connection device being a PPP server.

8. The wireless communications device of claim 1, wherein the IP address request message is an Internet Protocol Control Protocol (IPCP) CONFIG REQ message.

9. A method for a wireless communications device to perform IP address negotiations between a terminal device and a service network, comprising:
   receiving an IP address request message from the terminal device;
   determining whether allocated IP address and DNS address have been received from a service network in response to the received IP address request message; and
   sending a rejection message to the terminal device to trigger the terminal device to resend the IP address request message in response to determining that the allocated IP address and DNS address have not been received from the service network,
   wherein the rejection message is an Internet Protocol Control Protocol (IPCP) CONFIG REJ message without any content, and
   wherein the sending of the IP address resection message is delayed until a predetermined count number of successive IP address request messages have been received, subsequent to the last sending of the rejection message, from the terminal device.

10. The method of claim 9, further comprising:
   sending an IP address negative-acknowledgement (NACK) message with the allocated IP address and DNS address to the terminal device in response to determining that the allocated IP address and DNS address have been received from the service network;
   receiving an IP address request message with the allocated IP address and DNS address from the terminal device after the sending of the IP address NACK message; and
   sending an IP address acknowledgement (ACK) message with the allocated IP address and DNS address to the terminal device.

11. The method of claim 9, wherein the delaying step comprises:
   counting the received IP address request messages subsequent to the last sending of the rejection message;
   determining whether the received IP address request messages have reached the predetermined count number; and
   sending the rejection message to the terminal device in response to determining that the received IP address request messages have reached the predetermined count number.

12. The method of claim 11, wherein the delaying step comprises ignoring the currently received IP address request message in response to determining that the received IP address request messages have not reached the predetermined count number.

13. The method of claim 9, wherein the rejection message indicates to the terminal device that an IP configuration of the received IP address request message is not acceptable and a new IP configuration is included within.

14. The method of claim 13, wherein the rejection message is an Internet Protocol Control Protocol (IPCP) negative-acknowledgement (NACK) message without an IP address and DNS address.

* * * * *